Feb. 15, 1927.　　　　　　　　　　　　　　　1,617,424
W. J. SIMMONS
TRAP SET
Filed July 21, 1926　　　2 Sheets-Sheet 1
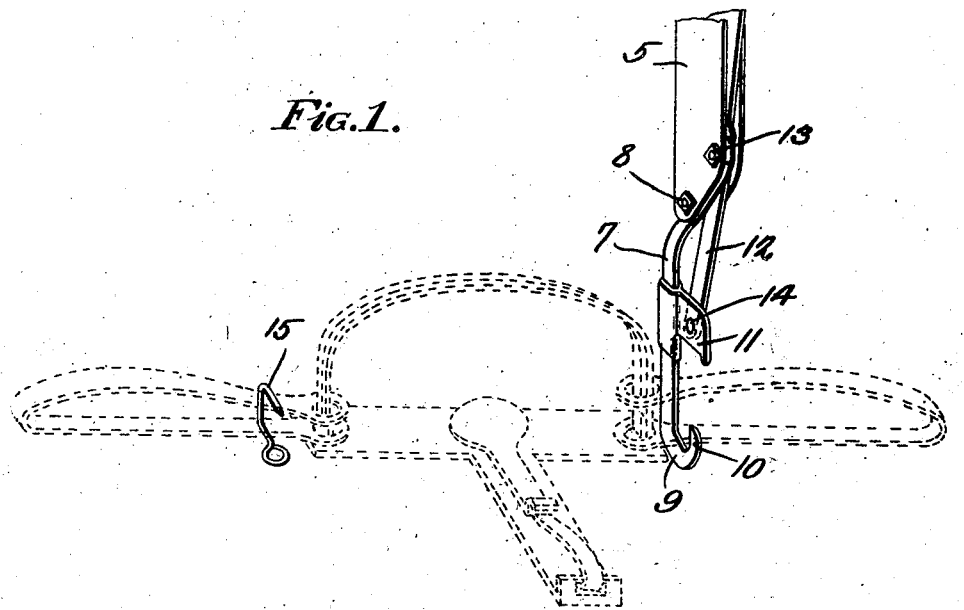
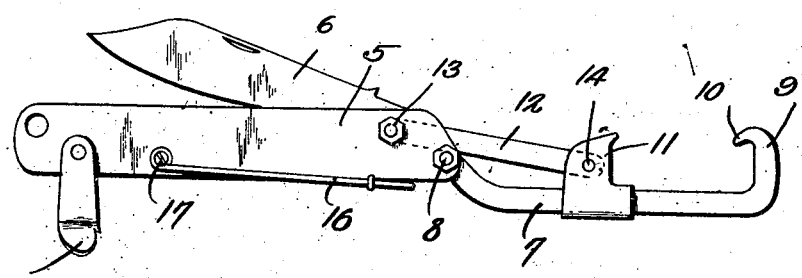
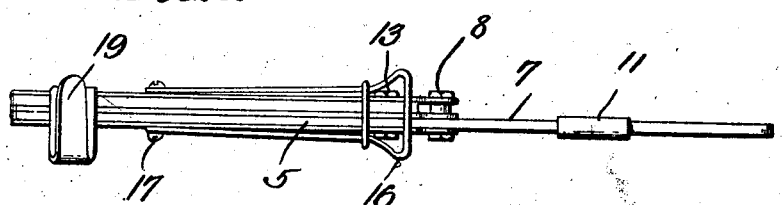
W. J. Simmons.
Inventor Feb. 15, 1927.

W. J. SIMMONS 1,617,424

TRAP SET

Filed July 21, 1926  2 Sheets-Sheet 2

W. J. Simmons,
Inventor

By C. A. Snow & Co.
Attorneys

Patented Feb. 15, 1927.

1,617,424

UNITED STATES PATENT OFFICE.

WILLIAM J. SIMMONS, OF FOREST LAKE, MINNESOTA.

TRAP SET.

Application filed July 21, 1926. Serial No. 123,945.

This invention relates to a device designed for use by trappers and designed to provide a mechanical means for setting a trap, thereby eliminating any possibility of injuring the hands of the person setting the trap, should the jaws be tripped and closed during the setting operation.

Another object of the invention is to provide a device of this character wherein the elements thereof may be folded into a small and compact article, simulating a pocket knife to the end that the device may be easily carried in the pocket of the user.

A still further object of the invention is to provide a substantially large blade, forming a part of the device, so that the device may be used for killing or skinning the animal caught by a trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a view illustrating the trap setting device at one end of the tool in position for setting a trap.

Figure 2 is a side elevational view of the tool.

Figure 3 is a rear elevational view thereof.

Figure 4:
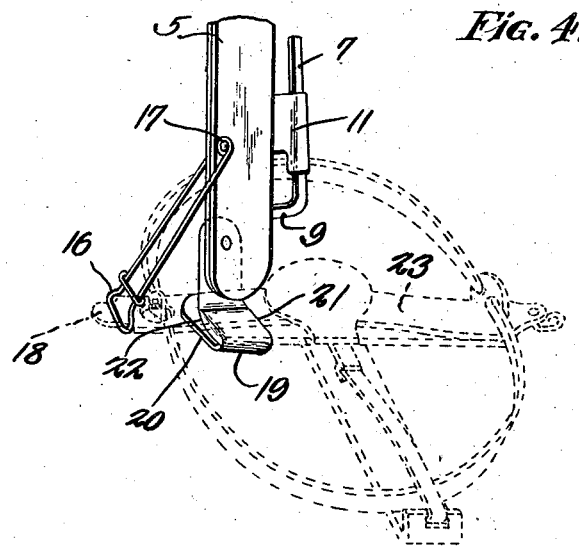
Figure 4 is a fragmental perspective view illustrating the setting mechanism at the opposite end of the tool, for use in setting a trap of a similar character to that shown by Figure 1.
Figure 5:
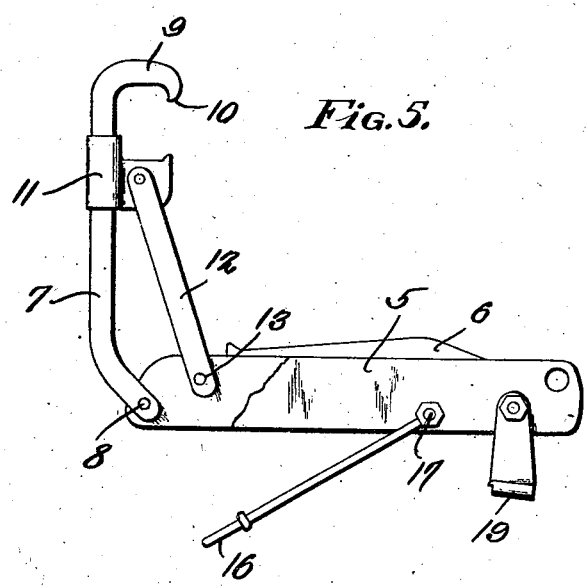
Figure 5 is a side elevational view of the tool illustrating the positions of the jaws when the trap is being set.
Figure 6:
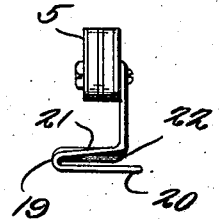
Figure 6 is an elevational view of the trap setting device and illustrating in detail the spring bar holding member.

Referring to the drawings in detail, the device includes a handle section 5 which is of a construction similar to the handle of a large jack knife, and in which handle the blade 6 is pivotally mounted.

The setting device which is employed in connection with jaw traps wherein the springs extend laterally from the trap, includes a bar 7 pivotally connected with the handle as at 8, the outer end thereof being extended at right angles as shown at 9 where the extreme end of the right angled portion 9 extends inwardly as at 10, the length of the right angled portion 9 being equal to the width of the spring member of the usual trap, so that the member 9 will be fitted over the spring member without possibility of the same falling therefrom.

Cooperating with the right angled portion 9 is a sliding jaw 11 mounted on the bar 7 as shown by Figure 2, there being provided a bar 12 connecting the jaw 11 with the handle portion 5. The bolt 13 connects the member 12 to the handle, while the pin 14 connects the member 12 to the jaw 11 in such a way that as the handle portion 5 is swung downwardly, from a position as shown by Figure 1, the jaw 11 will be moved towards the right angled portion 9 to engage the spring member of the jaw and move the spring member to its set position.

In case where the device is to be used in setting spring jaw traps wherein the springs extend from opposite sides of the jaws as shown by Figure 1, one of the springs is moved to its set position whereupon the hook member 15 is passed over the spring member to hold the spring member in this position so that the opposite spring may be moved to its set position without fear of the spring already set, moving the jaws to their closed positions.

When the handle 5 has been moved in a manner as described, the trigger of the trap and treadle are set, whereupon the device may be released.

At the opposite end of the handle portion 5 is a loop member 16 which is substantially long and pivotally connected with the handle at 17, the loop being designed to fit over the extension 18, shown in dotted lines as forming a part of the trap.

Pivotally connected to this end of the handle portion 5, is a clamping member 19 that embodies spaced jaws 20 and 21 respectively, the jaw 21 being formed with an inwardly extended flange 22 adapted to bite into the metal of the spring member which is indicated at 23, as shown in dotted lines in Figure 4, to insure against slipping of the member 9.

From the foregoing it will be obvious that due to the construction as described, the usual jaw trap employed for catching large animals may be set, without fear of the person setting the trap being injured by the jaws of the trap moving to their closed positions.

I claim:

1. A spring jaw trap setting device including a handle portion, a bar pivotally connected to the handle portion and having a hook formed at one end thereof, a jaw slidably mounted on the bar, a bar connected with the jaw and connected with the handle, and said bar adapted to move the jaw to engage the spring of the trap when the handle is swung downwardly.

2. A spring jaw trap setting device including a handle portion, a pivoted bar carried at one end of the handle portion, said bar having a right angled end portion terminating in an inwardly extended extremity defining a hook to embrace a portion of a trap spring, a slidable jaw on the bar and adapted to engage the spring to compress the spring, and said handle adapted to operate the slidable jaw when the handle is swung downwardly.

3. A spring jaw trap setting device including a handle portion, a bar pivotally connected with the handle portion, a jaw slidably mounted on the handle portion, a bar connected with the jaw and having connection with the handle portion, the last mentioned bar being pivotally connected to the handle portion in spaced relation with the first mentioned bar, and said jaws adapted to grip the spring of a trap when the handle portion is swung downwardly.

In testimony that I claim the foregoing as my own, I have hereto affixed my signature.

WILLIAM J. SIMMONS.